US007031883B1

(12) United States Patent
Lee

(10) Patent No.: US 7,031,883 B1
(45) Date of Patent: Apr. 18, 2006

(54) SPREADER

(75) Inventor: Chin Thong Lee, Singapore (SG)

(73) Assignee: Natsteel Engineering PTE LTD, Singapore (SG)

( * ) Notice: Subject to any disclaimer, the term of this patent is extended or adjusted under 35 U.S.C. 154(b) by 0 days.

(21) Appl. No.: 10/258,873

(22) PCT Filed: Apr. 24, 2000

(86) PCT No.: PCT/SG00/00054

§ 371 (c)(1),
(2), (4) Date: Apr. 28, 2003

(87) PCT Pub. No.: WO01/81231

PCT Pub. Date: Nov. 1, 2001

(51) Int. Cl.
*G06F 15/00* (2006.01)
*G06F 17/40* (2006.01)

(52) U.S. Cl. .................................................... 702/187

(58) Field of Classification Search .................. 702/85, 702/105, 182–183, 184, 187; 294/81.2, 81.21, 294/81.5, 81.51, 68.3; 212/312, 317, 223, 212/225, 247, 248
See application file for complete search history.

(56) References Cited

U.S. PATENT DOCUMENTS 4,636,962 A * 1/1987 Broyden et al. ............ 700/228
5,048,703 A 9/1991 Tax et al.
5,154,561 A * 10/1992 Lee ......................... 414/138.3
5,163,726 A * 11/1992 Boos et al. ................ 294/81.1
5,864,783 A 1/1999 Struck et al.
5,909,817 A * 6/1999 Wallace et al. ............. 212/275
5,931,625 A * 8/1999 Tax et al. ................ 414/140.3
6,124,932 A * 9/2000 Tax et al. ................... 356/614
6,161,887 A * 12/2000 Shiota et al. ............. 294/81.2

FOREIGN PATENT DOCUMENTS

| | | |
|---|---|---|
| DE | 4423797 | 1/1996 |
| EP | 0342655 | 11/1989 |
| EP | 0422821 | 4/1991 |
| WO | WO9219526 | 12/1992 |

OTHER PUBLICATIONS

International Search Report.

* cited by examiner

*Primary Examiner*—Bryan Bui
*Assistant Examiner*—Demetrius Pretlow
(74) *Attorney, Agent, or Firm*—Ostrolenk Faber Gerb & Soffen

(57) ABSTRACT

A spreader for lifting freight containers includes a frame having a number of pickup elements mounted thereon, a processor and a data storage device mounted on the frame. The processor is coupled to an interface device to receive outputs from a number of sensors mounted on the spreader and to store data received from the sensors in the data storage device.

13 Claims, 1 Drawing Sheet

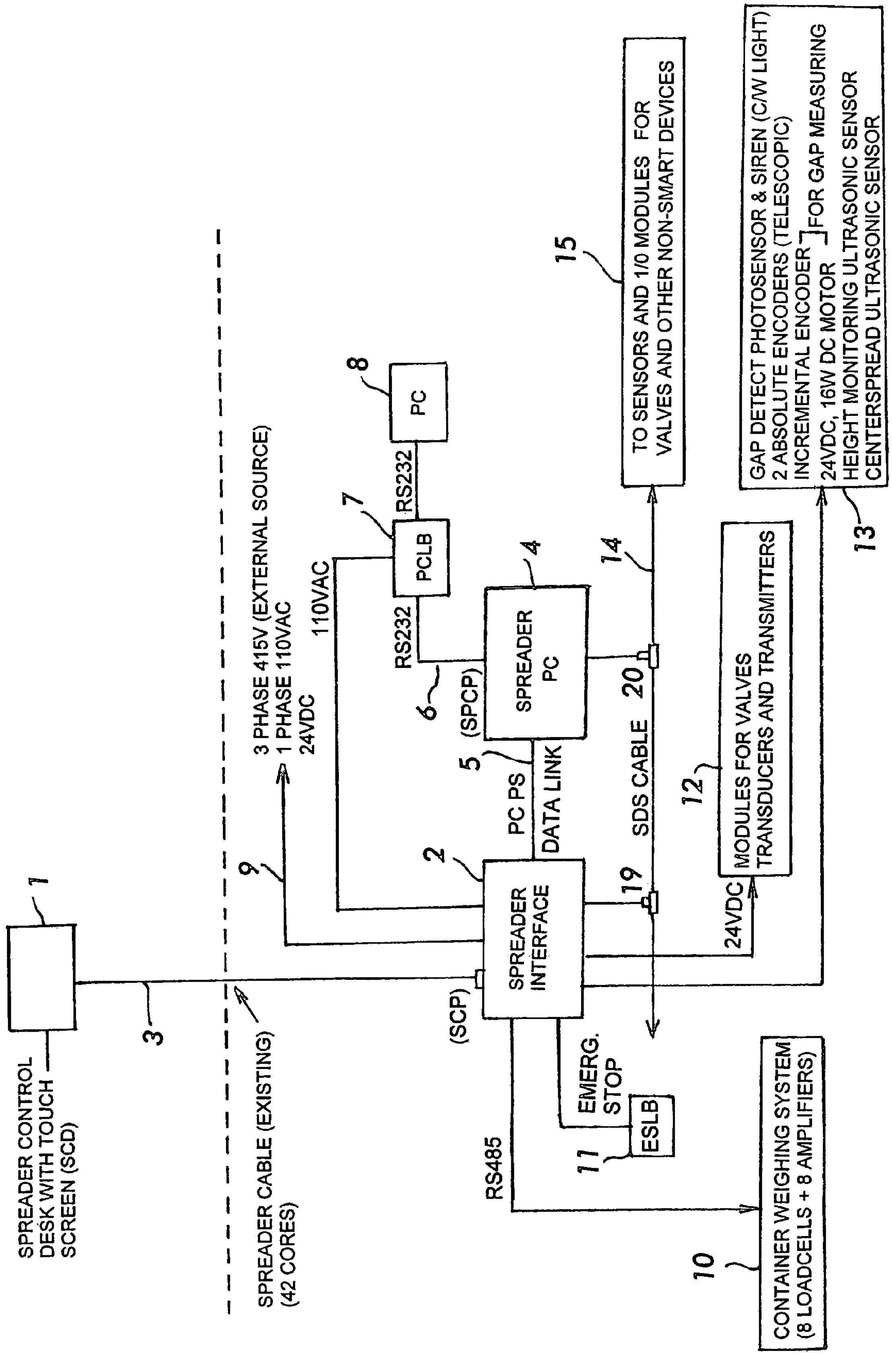
SPREADER CONTROL DESK WITH TOUCH SCREEN (SCD)
1
3
SPREADER CABLE (EXISTING) (42 CORES)
3 PHASE 415V (EXTERNAL SOURCE) 1 PHASE 110VAC 24VDC
9
110VAC
(SCP)
SPREADER INTERFACE
2
PC PS
DATA LINK
5
(SPCP)
6
RS232
SPREADER PC
4
PCLB
7
RS232
PC
8
19
SDS CABLE
20
14
TO SENSORS AND 1/0 MODULES FOR VALVES AND OTHER NON-SMART DEVICES
15
EMERG. STOP
ESLB
11
24VDC
MODULES FOR VALVES TRANSDUCERS AND TRANSMITTERS
12
RS485
CONTAINER WEIGHING SYSTEM (8 LOADCELLS + 8 AMPLIFIERS)
10
GAP DETECT PHOTOSENSOR & SIREN (C/W LIGHT)
2 ABSOLUTE ENCODERS (TELESCOPIC)
INCREMENTAL ENCODER
24VDC, 16W DC MOTOR
FOR GAP MEASURING
HEIGHT MONITORING ULTRASONIC SENSOR
CENTERSPREAD ULTRASONIC SENSOR
13

SPREADER

BACKGROUND OF THE INVENTION

The invention relates to a spreader and in particular, a spreader for lifting freight containers.

Conventionally, freight containers are lifted by engaging a lifting device known as a spreader to the top of the container. The spreader is connected to a crane by a lifting cable so that the crane can lift or lower the spreader. Spreaders are generally comprised of a metal frame having four pickup elements, commonly known as twistlocks located at each of the corners of the spreader. The twistlocks are adapted to engage with respective twistlock apertures in the top of the container and are rotated to lock the spreader to the container.

One of the problems with conventional spreaders is that they are often moved is from crane. Hence, it is difficult to maintain accurate historical data for the spreader as this can not be held with the crane as the spreader may be moved from one crane to another crane. Therefore, if a spreader malfunctions, it is generally not possible to get to obtain the historical data for the spreader for diagnostic purposes.

SUMMARY OF THE INVENTION

In accordance with the present invention, there is provided a spreader for lifting freight containers, the spreader comprising a frame having a number of pickup elements mounted thereon, a processor and a data storage device mounted on the frame, the processor being coupled to an interface device to receive outputs from sensors mounted on the spreader and to store data received from the sensors in the data storage device.

Preferably, the interface device is also coupled to actuation devices on the spreader to permit the processor to control the actuation devices in response to signals received from the sensor. Typically, the actuation devices may be valves and/or motors.

Typically, the interface device is adapted to be coupled to a remote control panel which is operated by an operator, the processor also controlling the actuation devices in response to signals received from the remote control panel via the interface device.

Preferably, the data is stored with an indication of the date and/or time it was received by the processor. The processor may calculate, average values for data received over a period of time and also store the average values, minimum values and/or maximum values in data over a period of time.

Preferably, the processor and the storage device form part of a single board computer.

Typically, the data storage device may be a flash memory device.

Preferably, the sensors may comprise one or more of load cells, ultrasonic sensors, photo-electric detectors, encoders or any other suitable sensor, detector or measurement device.

Preferably, an output device may be coupled to the processor to permit data stored in the data storage device to be downloaded to a remote data storage device or computer.

BRIEF DESCRIPTION OF THE DRAWING

An example of a spreader in accordance with the invention will now be described with reference to the accompanying drawings in which:

FIG. 1 is a block diagram of a system using a spreader in accordance with the invention.

DESCRIPTION OF A PREFERRED EMBODIMENT

FIG. 1 is a block diagram of a spreader control system. The system comprises an operator control panel 1 which is located in an operator's cabin on a crane on which the spreader is mounted. The control panel 1 is coupled to a spreader interface 2 by a conventional spreader cable 3 which supplies power to the spreader and transmits data signals between the control panel 1 and the spreader interface 2.

The spreader interface 2 is linked to a single board computer 4 by a power supply cable and data link 5. The single board computer 4 includes a processor and a flash memory. The single board computer 4 also has an output 6 to an output board 7 which enables an external computer 8 to be coupled to the output board 7 to download data stored in the flash memory on the single board computer 4 or to program the computer 4. The spreader interface 2 also has a power supply input 9 which enables the spreader to be powered when the spreader is not coupled to the spreader cable 3.

The spreader interface 2 is also coupled to a container weighing system 10 which includes load cells and amplifiers coupled to the twistlock elements to weigh a container being lifted to ensure that it is within the limits of the crane and spreader. The spreader interface 2 is also coupled to a manual emergency stop button 11, modules for valves, transducers and transmitters 12 and a number of sensors 13. The sensors 13 include a gap detect photosensor and siren, two absolute encoders for the telescopic arms of the spreader, an incremental encoder and DC motor for the gap detector photosensor, a height monitoring ultrasonic sensor to sense the height of a spreader above a container to be lifted as the spreader is lowered towards the container to be lifted, and if the spreader is a twinlift spreader with adjustable central pickup elements, ultrasonic sensors to measure the separation of the central twistlock elements. In addition, the spreader interface 2 and the single board computer 4 are coupled to a Honeywell Smart Device System (SDS) bus 14 which is coupled to sensors and input output modules for valves and other non-smart devices 15.

The single board computer 4 is mounted on the spreader using a shock absorbing mounting to minimise the effect of shocks to the spreader being transmitted to the single board computer 4.

In use, when an operator instructs the spreader to perform a specific action using the control panel 1, the control commands from the control panel 1 are transmitted through the spreader cable 3 to the spreader interface 2 which communicates the commands to the single board computer 4. In response to the commands, the single board computer 4 transmits control commands via the data link 5 to the spreader interface 2 to control the valves and motors 12 on the spreader to perform the actions instructed by the operator using the control panel 1.

In addition, the single board computer 4 receives output signals from the load cells and amplifiers 10 and sensors 13, 15 and where appropriate sends relevant information via the spreader interface 2 and spreader cable 3 to the control panel 1 for display to the operator. In addition, the single board computer 4 stores on the flash memory and a random access memory (RAM) in the single board computer 4 selected operating information data from the sensors.

The data which is stored on the flash memory 4 is typically historical data, and the length of time the data is stored can vary depending on the particular type of data. Typical historical data stored on the flash memory includes electrical system data (including incoming supply voltage and current, daily and monthly averages for overvoltages, undervoltages and overcurrents), hydraulic system data (including oil flow, oil pressure, oil temperature and oil level, daily and monthly averages, daily and monthly maximums and daily and monthly minimums, and alarms for oil flow, pressure, temperature and level, oil filter), hydraulic pump motor data (including motor start and duration of motor running, total running time of motor, change of motor, duration of motor thermal overload), twistlock data (including number of operations, number of times the twistlock valves are energised and duration of each twistlock operation alarm), flipper data (including number of operations of each flipper and number of times each flipper is energised), landpin data (including number of times each landpin is activated, duration of landpin alarms and change of landpins), central housing data (including data on the piston cylinders which actuate the telescopic arms of the spreader) and other historical data relating to the spreader.

The RAM is used to store real time data relating to the spreader such as the real time electrical system data, hydraulic system data, hydraulic pump motor data, twistlock data, flipper data, landpin data, central housing data, telescopic movement data, gap detection system data, beam lock mechanism data, load cell weighing data, height monitoring data and any other appropriate data.

Although in the example described above and shown in FIG. 1 a conventional spreader cable 3 is used to couple the interface 2 to the control panel 1, the invention has the advantage that by controlling the spreader by the computer 4 on the spreader, it is possible to couple the interface 2 to the control panel by a single serial link, a twisted pair link, fibre optic or any other suitable communication link, including a wireless communication link. This has the advantage that it is not necessary to use a conventional cable 3 which can be a 42 core cable.

The invention also has the advantage that by having a single board computer 4 mounted on the spreader, it is possible to store data with the spreader and to perform diagnostic operations and/or preventive maintenance using the stored data. This may be particularly useful if, for example, the spreader is malfunctioning. Furthermore, as the single board computer 4 is mounted on the spreader, even if the spreader is moved from one crane to another crane, all the data concerned with that spreader is kept with that spreader.

A further advantage is that by having the computer 4 mounted on the spreader it is possible to reduce the response time of the spreader to the commands entered at the control panel 1.

What is claimed is:

1. A spreader for lifting freight containers, the spreader comprising a frame having a number of pickup elements mounted thereon, a processor and a data storage device mounted on the frame, the processor being coupled to an interface device to receive outputs from a number of sensors mounted on the spreader and to store data received from the sensors in the data storage device, the data stored being system data accumulated during the operation of the spreader and being indicative of the history of the spreader.

2. A spreader according to claim 1, wherein the interface device is also coupled to a number of actuation devices on the spreader to permit the processor to control the actuation devices.

3. A spreader according to claim 2, wherein the processor controls the actuation devices in response to signals received from the sensor.

4. A spreader according to claim 2, wherein the actuation devices comprise valves and/or motors.

5. A spreader according to claim 1, wherein the interface device is adapted to be coupled to a remote control panel, the processor also controlling the actuation devices in response to signals received from the remote control panel via the interface device.

6. A spreader according to claim 1, wherein the processor and the data storage device form part of a single board computer.

7. A spreader according to claim 1, wherein the data storage device comprises a flash memory device.

8. A spreader according to claim 1, wherein the sensors comprise one or more of load cells, ultrasonic sensors, photo-electric detectors and encoders.

9. A spreader according to claim 1, further comprising an output device coupled to the processor to permit data stored in the data storage device to be downloaded to a remote data storage device.

10. A spreader according to claim 1 in which the stored data is stored with an indication of the date and/or time when it was received by the processor.

11. A method performing diagnostic operations and/or preventive maintenance of a spreader for lifting freight containers, the spreader comprising a frame having a number of pickup elements mounted thereon, a processor and a data storage device mounted on the frame, the method including the steps of:

the processor receiving via interface device outputs from a number of sensors mounted on the spreader and storing the data received from the sensors in the data storage device, the data stored being system data accumulated during the operation of the spreader and being indicative of the history of the spreader; and performing diagnostic operations and/or preventive maintenance of the spreader using the stored data.

12. A method according to claim 11 wherein the stored data is stored with an indication of the date and/or time when it was received by the processor.

13. A method according to claim 11 wherein the processor further stores averages, maximums and minimums of the system data over predetermined periods of time.

* * * * *